US011770796B2

(12) United States Patent
Lyu et al.

(10) Patent No.: US 11,770,796 B2
(45) Date of Patent: Sep. 26, 2023

(54) PAGING PROCESSING METHOD AND APPARATUS, DEVICE, AND STORAGE MEDIUM

(71) Applicant: QUECTEL WIRELESS SOLUTIONS CO., LTD., Shanghai (CN)

(72) Inventors: Ling Lyu, Shanghai (CN); Zhongzhi Yang, Shanghai (CN); Penghe Qian, Shanghai (CN)

(73) Assignee: QUECTEL WIRELESS SOLUTIONS CO., LTD., Shanghai (CN)

(*) Notice: Subject to any disclaimer, the term of this patent is extended or adjusted under 35 U.S.C. 154(b) by 0 days.

(21) Appl. No.: 18/111,485

(22) Filed: Feb. 17, 2023

(65) Prior Publication Data
US 2023/0209500 A1 Jun. 29, 2023

Related U.S. Application Data

(63) Continuation of application No. PCT/CN2021/116965, filed on Sep. 7, 2021.

(30) Foreign Application Priority Data

Jun. 2, 2021 (CN) .......................... 202110612947.8

(51) Int. Cl.
*H04W 4/70* (2018.01)
*H04W 68/00* (2009.01)

(52) U.S. Cl.
CPC ................. *H04W 68/005* (2013.01)

(58) Field of Classification Search
None
See application file for complete search history.

(56) References Cited

U.S. PATENT DOCUMENTS

2018/0139720 A1 5/2018 Chen et al.

FOREIGN PATENT DOCUMENTS

| CN | 109451849 | 3/2019 |
| CN | 11003 5498 | 7/2019 |

(Continued)

OTHER PUBLICATIONS

LI Y,Method for Paging Narrowband Terminal Network Device Base Station and System, 2021 (Year: 2021).*

(Continued)

*Primary Examiner* — Gary Lafontant
(74) *Attorney, Agent, or Firm* — Fish & Richardson P.C.

(57) ABSTRACT

The present application provides a paging processing method and apparatus, a device, and a storage medium. One example method is applied to a base station including a paging unit, and the method includes: performing paging management on the paging unit according to a preset service mode, to obtain a plurality of paging processing units, where different paging processing units manage UEs corresponding to different preset service modes; receiving service request information reported when a UE sends a service request to the base station, wherein the service request information comprises a UE service mode and a UE identity that are corresponding to the UE: based on the UE service mode and the UE identity, establishing and storing a first correspondence between the UE service mode and the UE identity; and determining, based on the first correspondence and a present service mode, a paging unit that manages paging for the UE.

18 Claims, 10 Drawing Sheets

RAN area and tracking area

(56) References Cited

FOREIGN PATENT DOCUMENTS

| CN | 110730445   |   | 1/2020 |             |
|----|-------------|---|--------|-------------|
| CN | 109819392 B | * | 1/2021 | ..... H04W 4/02 |
| CN | 107071705 B | * | 2/2021 | ..... H04W 4/70 |
| CN | 112804750   |   | 5/2021 |             |
| CN | 113225696   |   | 8/2021 |             |
| EP | 2369883     |   | 9/2011 |             |

OTHER PUBLICATIONS

Jin Y, Method and Device for Reporting Position Information, Jin Y, 2021 (Year: 2021).*
Office Action in Chinese Appln. No. 202110612947.8, dated Dec. 21, 2021, 24 pages (with English translation).
PCT International Search Report and Written Opinion in International Appln. No. PCT/CN2021/116965, dated Feb. 28, 2022, 9 pages (partial English translation).
Qualcomm Incorporated, "Paging Enhancements for Idle Inactive UE Power Saving," 3GPP TSG-RAN WG1 #105-e, R1-2104682, May 10-27, 2021, 16 pages.
Sony, "Discussion on potential paging enhancements," 3GPP TSG RAN WG1 #105, RI-2105174, May 10-27, 2021, 6 pages.

\* cited by examiner

RAN area and tracking area

Paging initiated by AMF

Paging initiated by AMF

PAGING PROCESSING METHOD AND APPARATUS, DEVICE, AND STORAGE MEDIUM

CROSS-REFERENCE TO RELATED APPLICATIONS

The present application is a continuation application of International Application No. PCT/CN2021/116965, filed on Sep. 7, 2021, which claims priority to Chinese patent application No. 202110612947.8 filed on Jun. 2, 2021. Both applications are incorporated herein by reference in their entireties.

TECHNICAL FIELD

The present application relates to a field of communication technologies, and specifically, to a paging processing method and apparatus, a device, and a storage medium.

BACKGROUND

With the development of mobile communication technologies, a new generation wireless evolution system-a fifth generation mobile communications system (5G) adopts a large-scale Multiple Input Multiple Output (MIMO) technology, a non-orthogonal multiple access technology, a co-frequency full-duplex communication technology, a novel encoding technology, a high-order modulation technology, and the like, so that a peak rate can be up to a standard of Gbit/s, so as to meet large-scale data transmission such as high-definition video and virtual reality; a delay level of an air interface needs to be about 1 ms, to meet real-time applications such as automatic driving and telemedicine; and an ultra-large network capacity provides connection capability of hundreds of billions of devices and satisfies Internet of Things communication.

Paging of a current 5G system may be divided into three types, one of which is that information of paging a user equipment (UE) initiated by a 5G Core Network (5GC) is cooperated by a plurality of network elements inside the 5GC and finally sent by an Access and Mobility Management Function (AMF) to a 5G Radio Access Network (RAN) side for triggering. A paging message sent by 5G RAN is broadcast on all cell groups in a Tracking Area (TA). When the network wants to send a downlink message or data, a UE needs to return to a connected mode (RRC_CONNECTED) state through paging. In order to enable the signaling/data to reach the UE or the 5GC, a paging process is triggered. A current paging range is extended from a TA to an RAN area, that is, all UEs of the RAN receive a paging message. UE paged by the core network can correctly receive paging information transmitted based on a scheduled Physical Downlink Control Channel (PDCCH) and/or Physical Downlink Shared Channel (PDSCH). When the UE monitors that a specific PI-RNTI indication is carried in a paging message DCI, demodulation is started, and a corresponding PDCCH and/or PDSCH is decoded to extract its own paging message. However, other UEs in the TA need to perform blind detection continuously (on the PDCCH and PDSCH) in order to monitor whether there is paging information for them. Thus, the other UEs need to traverse resource aggregation levels of an entire search space, and in this case, a plurality of UEs or all UEs simultaneously consume power continuously, resulting in energy waste.

SUMMARY

Embodiments of the present application provide a paging processing method and apparatus. a device, and a storage medium, so that energy consumption may be effectively reduced.

According to a first aspect, a paging processing method is provided and applied to a base station including a paging unit. The method includes: performing paging management division on the paging unit according to a preset service mode, to obtain a plurality of paging processing units, where different paging processing units manage UEs corresponding to different preset service modes; receiving, from a core network, a paging message carrying a service mode indication and a target UE identity; and triggering a target paging processing unit corresponding to the service mode indication to initiate paging of a target UE, where the target UE is a UE including the target UE identity and managed by the target paging processing unit.

In the first aspect, the method further includes: receiving service request information reported when UE establishes a service request with the base station for the first time, where the service request information includes a UE service mode and a UE identity that are corresponding to the UE; based on the UE service mode and the UE identity, establishing and storing a first correspondence between the UE service mode and the UE identity; and determine, based on the first correspondence and the preset service mode, a UE managed by each paging processing unit.

In the first aspect, the base station includes a central unit and a distributed unit, and the performing paging management division on the paging unit according to a preset service mode, to obtain a plurality of paging processing units includes: performing, according to the preset service mode, paging management division on one paging unit located in the distributed unit, to obtain a plurality of paging processing units: or performing, according to the preset service mode, paging management division on a plurality of paging units located in the distributed unit, to obtain a plurality of paging processing units.

In the first aspect, the receiving, from a 5G core network, a paging message carrying a service mode indication and a target UE identity includes: controlling the central unit to receive, from the core network, an NGAP paging message carrying the service mode indication and the target UE identity; and controlling the central unit to perform signaling service on the NGAP paging message through an F1 interface to generate an F1AP paging message, and to send the F1AP paging message to the distributed unit, where the F1AP paging message carries the service mode indication and the target UE identity.

In the first aspect, the triggering a target paging processing unit corresponding to the service mode indication to initiate paging of a target UE includes: determining the target UE based on the service mode indication and the first correspondence; matching the service mode indication with the preset service mode to determine, from the plurality of paging processing units, the target paging processing unit corresponding to the service mode indication; and controlling the target paging processing unit to initiate paging of the target UE.

In the first aspect, the determining the target UE based on the service mode indication and the first correspondence includes; matching the service mode indication with a UE service mode in the first correspondence to determine, from all UE identities in the first correspondence, a candidate UE identity that matches the service mode indication, where the candidate UE identity includes the target UE identity; and determine a UE corresponding to the candidate UE identity as the target UE.

In the first aspect, the preset service mode includes an enhanced mobile broadband eMBB, a massive machine type communication mMTC, or an ultra-reliable low-latency communication URLLC, and the performing paging management division on the paging unit based on a preset service mode, to obtain a plurality of paging processing units includes: performing paging management division on the paging unit according to the preset service mode, to obtain a paging processing unit corresponding to the eMBB, a paging processing unit corresponding to the mMTC, and a paging processing unit corresponding to the URLLC.

According to a second aspect, a paging processing method is provided and applied to a UE. The method includes: when reading cell broadcast information sent by a base station for the first time, controlling, based on a paging assistance indication carried in the cell broadcast information, the UE to establish a service request with the base station and reporting service request information, where the service request information includes a UE service mode and a UE identity that are corresponding to the UE; receiving a paging message sent by a target paging processing unit in the base station, where the paging message carries a service mode indication and a target UE identity, and the target paging processing unit is a paging processing unit related to the service mode indication and the UE service mode; when the UE service mode matches the service mode indication, detecting the paging message and performing a CRC check on a CCE in a search space belonging to a current UE; and if the CRC check is successful, determining that the paging message is a paging message required by the current UE itself, and further decoding the paging message; or if the CRC check fails, determining that the paging message does not belong to a paging message required by the current UE itself, and then discarding the paging message.

According to a third aspect, a paging processing apparatus is provided and applied to a base station including a paging unit. The apparatus includes: a division module, configured to perform paging management division on the paging unit according to a preset service mode, to obtain a plurality of paging processing units, where different paging processing units manage UEs corresponding to different preset service modes; a first receiving module, configured to receive, from a 5G core network, a paging message carrying a service mode indication and a target UE identity; and a paging module, configured to trigger a target paging processing unit corresponding to the service mode indication to initiate paging of a target UE, where the target UE is a UE including the target UE identity and managed by the target paging processing unit.

In the third aspect, the apparatus further includes an establishment module, configured to: receive service request information reported when a UE establishes a service request with the base station for the first time, where the service request information includes a UE service mode and a UE identity that are corresponding to the UE; based on the UE service mode and the UE identity, establish and store a first correspondence between the UE service mode and the UE identity; and determine, based on the first correspondence and the preset service mode, a UE managed by each paging processing unit.

In the third aspect, the base station includes a central unit and a distributed unit, and the division module is configured to: perform, according to the preset service mode, paging management division on one paging unit located in the distributed unit, to obtain a plurality of paging processing units; or perform, according to the preset service mode, paging management division on a plurality of paging units located in the distributed unit, to obtain a plurality of paging processing units.

In the third aspect, the first receiving module is configured to: control the central unit to receive, from the core network, an NGAP paging message carrying the service mode indication and the target UE identity; and control the central unit to perform signaling service on the NGAP paging message through an F1 interface to generate an F1AP paging message, and send the F1AP paging message to the distributed unit, where the F1AP paging message carries the service mode indication and the target UE identity.

In the third aspect, the paging module is configured to: determine the target UE based on the service mode indication and the first correspondence; match the service mode indication with the preset service mode to determine, from the plurality of paging processing units, the target paging processing unit corresponding to the service mode indication; and control the target paging processing unit to initiate paging of the target UE.

In the third aspect, the paging module being configured to determine the target UE based on the service mode indication and the first correspondence specifically includes: matching the service mode indication with a UE service mode in the first correspondence to determine, from all UE identities in the first correspondence, a candidate UE identity that matches the service mode indication, where the candidate UE identity includes the target UE identity; and determining a UE corresponding to the candidate UE identity as the target UE.

In the third aspect, the preset service mode includes an eMBB, an mMTC, and an URLLC, and the division module is configured to: perform paging management division on the paging unit according to the preset service mode, to obtain a paging processing unit corresponding to the eMBB, a paging processing unit corresponding to the mMTC, and a paging processing unit corresponding to the URLLC.

According to a fourth aspect, a paging processing apparatus is provided and applied to a UE. The apparatus includes: a reporting module, configured to: when reading cell broadcast information sent by a base station for the first time, control the UE based on a paging assistance indication carried in the cell broadcast information to establish a service request with the base station and report service request information, where the service request information includes a UE service mode and a UE identity that are corresponding to the UE; a second receiving module, configured to receive a paging message sent by a target paging processing unit in the base station, where the paging message carries a service mode indication and a target UE identity, and the target paging processing unit is a paging processing unit related to the service mode indication and the UE service mode; a check module, configured to: when the UE service mode matches the service mode indication, detect the paging message and perform a CRC check on a CCE in a search space belonging to a current UE; and a processing module, configured to: if the CRC check is successful, determine that the paging message is a paging message required by the current UE itself, and further decode the paging message; or if the CRC check fails, determine that the paging message does not belong to a paging message required by the current UE itself, and then discard the paging message.

In a fifth aspect, a network device is provided and includes a processor and a memory. The memory is configured to store a computer program, and the processor is configured to call and run the computer program stored in the memory to perform the paging processing method according to the first aspect.

In a sixth aspect, a network device is provided and includes a processor and a memory. The memory is configured to store a computer program, and the processor is configured to call and run the computer program stored in the memory to perform the method according to the second aspect.

In a seventh aspect, a computer-readable storage medium is provided. The computer-readable storage medium stores a computer program, and the computer program is adapted to be loaded by a processor to perform the paging processing method according to any one of the first aspect or the second aspect, or implementations thereof.

In an eighth aspect, a computer program product is provided and includes computer program instructions. The computer program instructions cause a computer to perform the paging processing method according to any one of the first aspect or the second aspect, or implementations thereof.

In a ninth aspect, a computer program is provided. When the computer program is run on a computer, the computer is enabled to perform the paging processing method according to any one of the first aspect or the second aspect, or implementations thereof.

The embodiments of the present application provide a paging processing method and apparatus, a device, and a storage medium. A base station performs paging management division on a paging unit according to a preset service mode, to obtain a plurality of paging processing units, where different paging processing units manage UEs corresponding to different preset service modes; receives, from a core network, a paging message carrying a service mode indication and a target UE identity; and triggers a target paging processing unit corresponding to the service mode indication to initiate paging of a target UE, where the target UE is a UE including the target UE identity and managed by the target paging processing unit. According to an embodiment of the present application, when receiving, from a core network, a paging message carrying a service mode indication and a target UE identity, the base station triggers, based on the service mode indication carried in the paging message, a target paging processing unit corresponding to the service mode indication, and controls the target paging processing unit to initiate paging of all UEs related to the service mode indication and managed by the target paging processing unit, but does not initiate paging of another UE associated with another service mode, so that power consumption may be reduced.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following descriptions show merely some embodiments of the present application, and a person of ordinary skill in the art may still derive others drawings from these accompanying drawings without creative efforts.

DETAILED DESCRIPTION OF THE EMBODIMENTS

The following describes the technical solutions in the embodiments of the present application with reference to the accompanying drawings in the embodiments of the present application. Apparently, the described embodiments are only some rather than all of the embodiments of the present application. All other embodiments obtained by a person of ordinary skill in the art based on the embodiments of the present application without creative efforts fall within the protection scope of the present application.

Three application scenarios are defined in 5G, namely, eMBB, mMTC, and URLLC. The eMBB scenario is a human-centered application scenario, which focuses on mobility at an ultra-high transmission data rate and under wide coverage, and the like. In the URLLC scenario, 1 ms level of connection delay is required, and high reliability (99.999%) connection in a case of high-speed (500 KM/H) movement is required to be supported. Powerful connectivity in the mMTC scenario may quickly facilitate deep integration of vertical industries (such as smart cities, smart home, and environmental monitoring).

Figure 1:
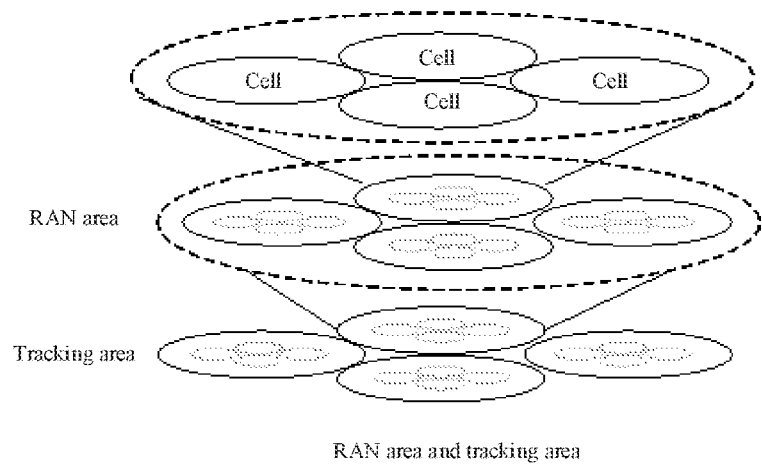
FIG. 1 is a schematic diagram of a network structure according to an embodiment of the present application.

For example, FIG. 1 shows a schematic diagram of a network structure, in which cells of 5G NR constitutes a larger RAN area, and the RAN area constitutes a larger tracking area. Thus, each cell belongs to one RAN area and one tracking area. A tracking area is the basis for tracking a core network level terminal, and an RAN area is the basis for tracking a radio access network level terminal.

Paging of a current 5G system may be divided into three types, one of which is that information of paging a UE initiated by a 5GC is cooperated by a plurality of network elements inside the 5GC and finally sent by an AMF to a 5G RAN side for triggering. A paging message sent by 5G RAN is broadcast on all cell groups in a TA. When the UE moves between TAs, a core network is informed by a TAU of a TA in which the UE is currently located. In an inactive mode (RRC_INACTIVE) state, a notification area (NA) similar to TA in concept is introduced. When the UE moves between NAs, the network is informed through a notification area unit (NAU) of an NA in which the UE is located.

Therefore, when the network wants to send a downlink message or data, the UE needs to return to a connected mode (RRC_CONNECTED) state through paging. In order to enable the signaling/data to reach the UE or the 5GC, a paging process is triggered. A current paging range is extended from a TA to an RAN area, that is, all UEs of the RAN receive a paging message. UE paged by the core network can correctly receive paging information transmitted based on a scheduled PDCCH and/or PDSCH. When the UE monitors that a specific PI-RNTI indication is carried in a paging message DCI, demodulation is started, and a corresponding PDCCH and/or PDSCH is decoded to extract its own paging message.

However, other UEs in the TA need to perform blind detection continuously (on the PDCCH and PDSCH) in order to monitor whether there is paging information for them. Thus, the other UEs need to traverse resource aggregation levels of an entire search space, and in this case, a plurality of UEs or all UEs simultaneously consume power continuously. In particular, UE in an idle mode (RRC_IDLE) state or an inactive mode (RRC_INACTIVE) state, or UE in an extended discontinuous reception mode (Extended DRX, eDRX) state or a power-saving mode (Power Saving Mode, PSM) state periodically detects paging, thus consuming power.

Therefore, the present application provides a paging processing method. When receiving, from a core network, a paging message carrying a service mode indication and a target UE identity, a base station triggers, based on the service mode indication carried in the paging message, a target paging processing unit corresponding to the service mode indication, and controls the target paging processing unit to initiate paging of all UEs related to the service mode indication and managed by the target paging processing unit, but does not initiate paging of another UE associated with another service mode, so that power consumption of UEs can be greatly reduced, energy consumption may be effectively reduced, and paging efficiency may be improved.

Embodiments of the present application may be applied to various communications systems, such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, an NR system, an evolution system of the NR system, an LTE-based access to unlicensed spectrum (LTE-U) system, an NR-based access to unlicensed spectrum (NR-U) system, a Universal Mobile Telecommunication System (UMTS), a wireless local area network (WLAN), wireless fidelity (Wi-Fi), a next generation communications system or another communications system.

Generally, conventional communications systems support a limited number of connections and are also easy to implement. However, with the development of communication technologies, mobile communications systems will not only support conventional communication, but will also support, for example, Device to Device (D2D) communication, Machine to Machine (M2M) communication, Machine Type Communication (MTC), and Vehicle to Vehicle (V2V) communication, and the embodiments of the present application may also be applied to these communications systems.

In some embodiments, a communications system in the embodiments of the present application may be applied to a Carrier Aggregation (CA) scenario, a Dual Connectivity (DC) scenario, or a Standalone (SA) networking scenario.

Figure 2:
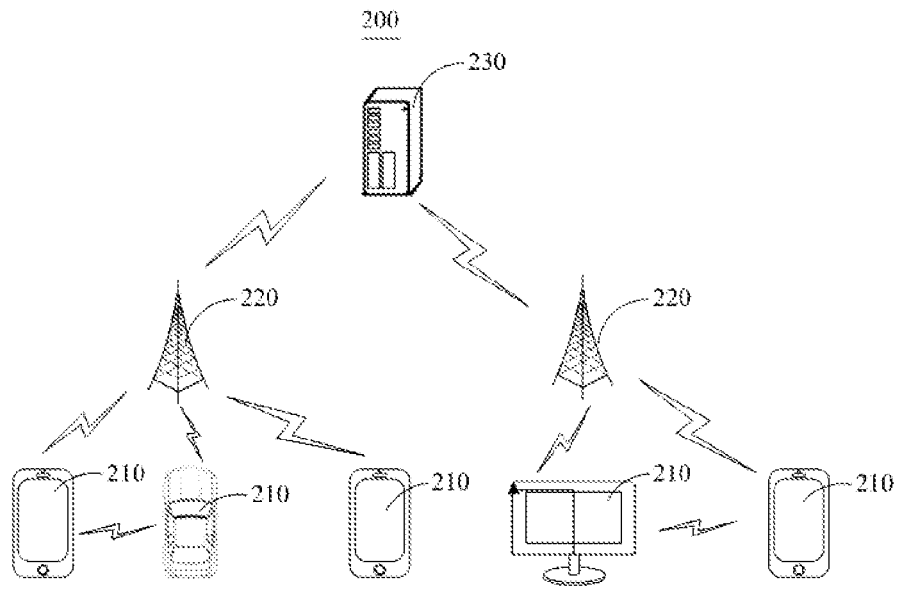
FIG. 2 is a schematic diagram of a first structure of a communications system according to an embodiment of the present application.
Figure 3:
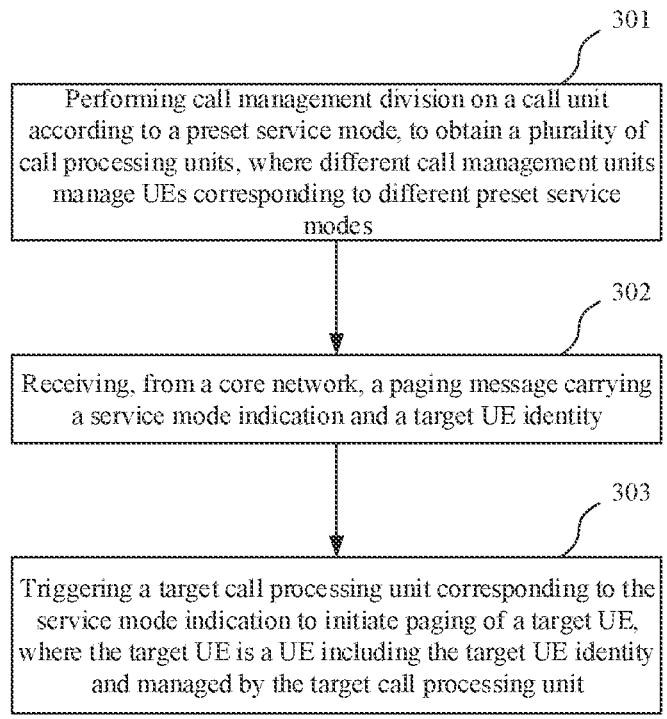
FIG. 3 is a schematic diagram of a first process of a paging processing method according to an embodiment of the present application.

Referring to FIG. 2, FIG. 2 is a schematic diagram of a structure of a communications system according to an embodiment of the present application. The communications system 200 may include a plurality of terminal devices 210 and a plurality of network devices 220. A network device 220 may provide communication coverage for a specific geographic area, and may communicate with terminal devices 210 located within the coverage area. FIG. 2 shows an example of three network devices and five terminal devices. The communications system may include a plurality of network devices, and another quantity of terminal devices may be included within a coverage range of each network device, which is not limited in the embodiment of the present application.

The terminal device 210 may alternatively be referred to as UE, an access terminal, a user unit, a user station, a mobile station, a mobile site, a remote station, a remote terminal, a mobile device, a user terminal, a terminal, a wireless communications device, a user agent, a user apparatus or the like. The terminal device 210 may be a STAION (ST) in a WLAN, may be a cellular telephone, a cordless telephone, a Session Initiation Protocol (SIP) telephone, a Wireless Local Loop (WLL) station, a Personal Digital Assistant (PDA) device, a handheld device with a wireless communication function, a computing device or another processing device connected to a wireless modem, an in-vehicle device, or a wearable device, or may be a next generation communications system, such as a terminal device in an NR network or a terminal device in a future evolved Public Land Mobile Network (PLMN) network.

As an example, rather than limitation, the terminal device 210 may alternatively be a wearable device. The wearable device may also be referred to as a wearable intelligent device, which is a general term of wearable devices such as glasses, gloves, watches, clothes, and shoes intelligently designed and developed by using a wearable technology. Alternatively, the terminal device 210 may be an unmanned aerial vehicle device. Alternatively, the terminal device 210 may be an in-vehicle device, for example, a trip computer with a wireless communication function, or a wireless user device externally connected to a trip computer. Alternatively, the terminal device 210 may be a roadside device, for example, a roadside lamp, a signal lamp, or another roadside device with a wireless communication function.

The network device 220 may be a device for communicating with a mobile device. The network device 220 may be an Access Point (AP) in a WLAN, a Base Transceiver Station (BTS) in GSM or CDMA, a NodeB (NB) in WCDMA, an Evolutional Node B (eNB or eNodeB) in LTE, a relay station or an access point, an in-vehicle device, a wearable device, a network device in an NR network or a base station (gNB) or a network device in a future evolved PLMN network, or the like.

In the embodiment of the present application, a network device 220 provides a service for a cell, and the terminal devices 210 communicate with the network device 220 through transmission resources (such as a frequency domain resource, a frequency spectrum resource) used by the cell. The cell may be a cell corresponding to the network device 220 (for example, a base station), and the cell may belong to a macro base station or a base station corresponding to a small cell. The small cell herein may include a Metro cell, a Micro cell, a Pico cell, a Femto cell, and the like. The small cell has characteristics of small coverage and low transmit power, and is suitable for providing a high-rate data transmission service.

A wireless connection may be established between the network device 220 and the terminal devices 210 through a wireless air interface.

For example, an End to End (E2E) connection may also be established between the terminal devices 210.

In some embodiments, the communications system may further include a network management device 230. A plurality of network devices 220 (base stations) are each connected to the network management device 230. The network management device 230 may be a core network device in a wireless communications system. For example, the network management device 230 may be a Mobility Management Entity (MME) in an Evolved Packet Core (EPC). Alternatively, the network management device may be another core network device, such as a 5G core network, a Serving GateWay (SGW), a Public Data Network GateWay (PGW), a Policy and Charging Rules Function (PCRF), or a Home Subscriber Server (HSS). An implementation form of the network management device 230 is not limited in the embodiment of the present application.

It should be understood that, in the present application, a Multiple-Input Multiple-Output (MIMO) technology may be used.

In the embodiment of the present application, when an AMF inside a 5G core network (network management device 230) triggers a paging message to be sent to a 5G RAN, a paging message (NGAP paging message) carrying a service mode indication and a target UE identity is triggered. A base station (network device 220) receives, from the 5G core network, the paging message carrying the service mode indication and the target UE identity, and triggers a target paging processing unit corresponding to the service mode indication to initiate paging of a target UE (terminal device 210). The target UE is a UE including the target UE identity and managed by the target paging processing unit. According to the embodiment of the present application, when receiving, from a 5G core network, a paging message carrying a service mode indication and a target UE identity, a base station triggers, based on the service mode indication carried in the paging message, a target paging processing unit corresponding to the service mode indication, and controls the target paging processing unit to initiate paging of all UEs related to the service mode indication and managed by the target paging processing unit, but does not initiate paging of another UE associated with another service mode, so that power consumption of UEs can be greatly reduced, energy consumption may be effectively reduced, and paging efficiency may be improved.

Referring to FIG. 3 to FIG. 13, FIG. 3 is a schematic diagram of a first process of a paging processing method according to an embodiment of the present application, and FIG. 4 to FIG. 13 are schematic diagrams of application scenarios according to embodiments of the present application. The method is applied to a base station including a paging unit, and the method includes the following steps.

Step 301: Performing paging management division on the paging unit according to a preset service mode, to obtain a plurality of paging processing units, where different paging processing units manage UEs corresponding to different preset service modes.

In some embodiments, the preset service mode includes an eMBB, an mMTC, and an URLLC. The performing paging management division on the paging unit according to a preset service mode, to obtain a plurality of paging processing units includes, performing paging management division on the paging unit based on the preset service mode, to obtain a paging processing unit corresponding to the eMBB, a paging processing unit corresponding to the mMTC, and a paging processing unit corresponding to the URLLC.

Figure 4:
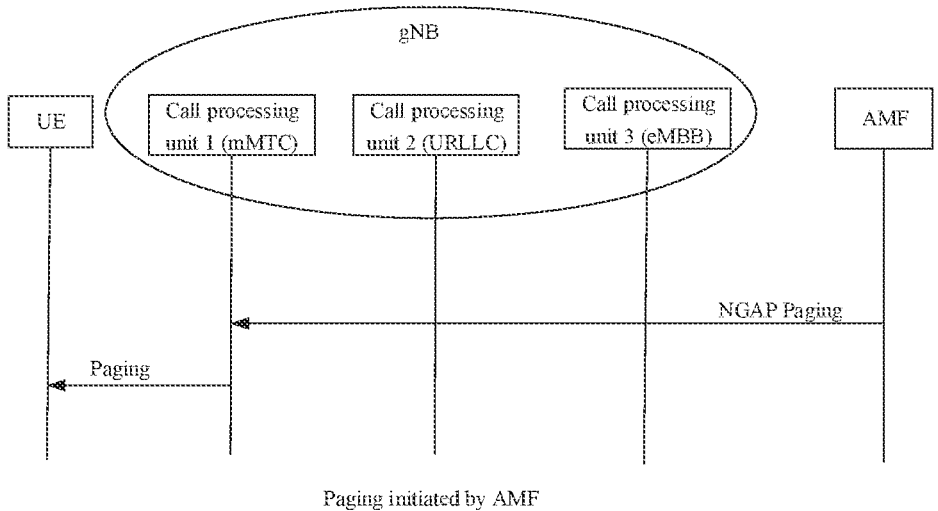
FIG. 4 is a schematic diagram of a first application scenario according to an embodiment of the present application.
Figure 5:
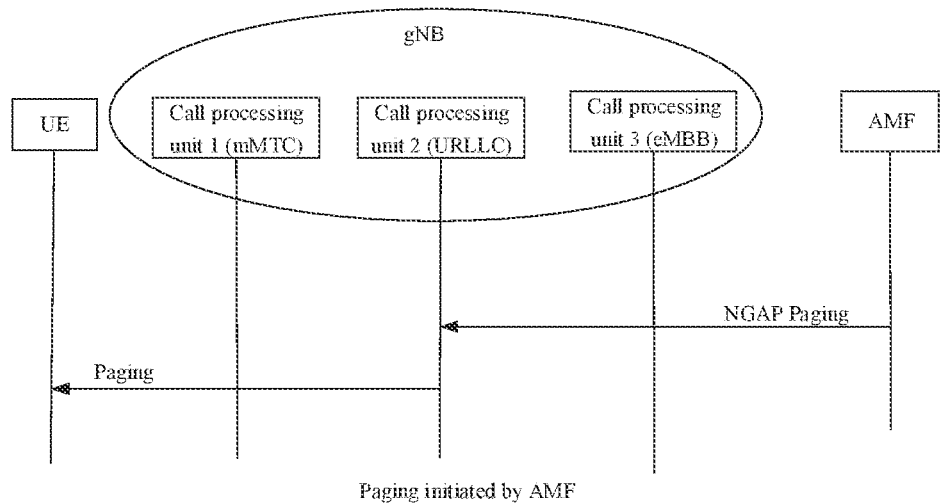
FIG. 5 is a schematic diagram of a second application scenario according to an embodiment of the present application.
Figure 6:
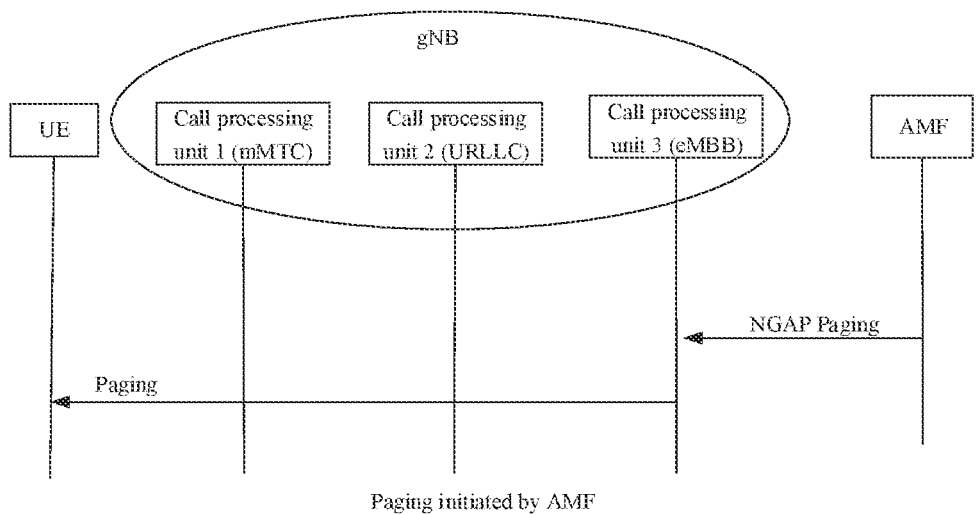
FIG. 6 is a schematic diagram of a third application scenario according to an embodiment of the present application.

For example, as shown in FIG. 4 to FIG. 6, paging management of preset service modes including an mMTC, an URLLC, and an eMBB are respectively embodied in different paging processing units of gNB, for example, a paging processing unit 1 corresponding to the mMTC, a paging processing unit 2 corresponding to the URLLC, and a paging processing unit 3 corresponding to the eMBB. This management mode uses logical management separation rather than physical management separation. Physically there is still one gNB, but logically there are three gNBs. In management of gNB resources, according to service modes requested in a service request initiated during user service registration, a list is maintained in gNB according to the service modes, and the resources are divided into different paging management resources, which are respectively corresponding to different service modes: an eMBB, an URLLC, and an mMTC. Each paging management resource maintains a UE list and all UEs in the list correspond to a same service mode.

For example, the preset service mode may further include service modes such as an eMBB, an URLLC, an mMTC, an LTE, and other services. Paging management division may be performed on a physical paging unit according to the preset service modes, so as to logically obtain a plurality of paging processing units corresponding to different preset service modes.

In some embodiments, the base station includes a central unit and a distributed unit, and the performing paging management division on the paging unit according to a preset service mode, to obtain a plurality of paging processing units includes: performing, according to the preset service mode, paging management division on one paging unit located in the distributed unit, to obtain a plurality of paging processing units; or performing, according to the preset service mode, paging management division on a plurality of paging units located in the distributed unit, to obtain a plurality of paging processing units.

Figure 7:
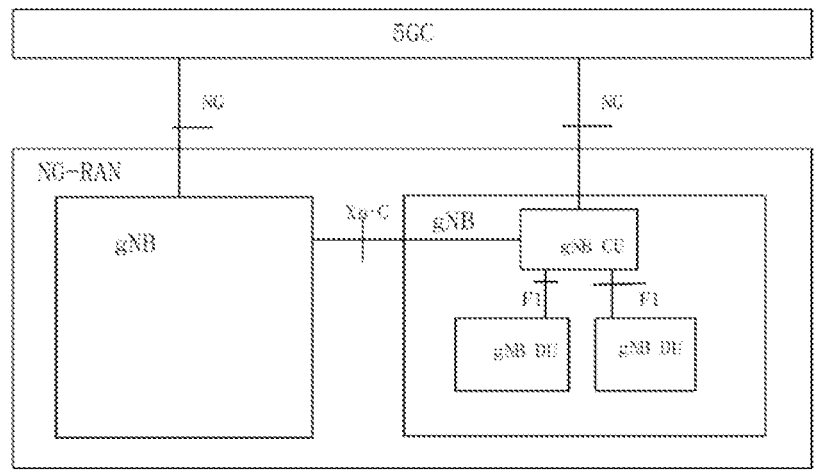
FIG. 7 is a schematic diagram of a fourth application scenario according to an embodiment of the present application.

As shown in FIG. 7, a logic architecture of a 5G base station (generation Node-B, gNB) uses a central unit (CU)

and a distributed unit (DU) separation mode. Based on configuration of a protocol stack function, the CU-DU logic architecture may be divided into a CU-DU distribution architecture and a CU-DU fusion architecture. The 5GC-RAN architecture diagram shown in FIG. 7 includes two gNBs respectively on the left part and the right part. A logical interface between the 5GC and the gNBs may be an NG interface, a logical interface between gNBs on the left part and the right part may be an Xn-C interface, and a logical interface between a gNB CU and a gNB DU may be an F1 interface.

Figure 8:
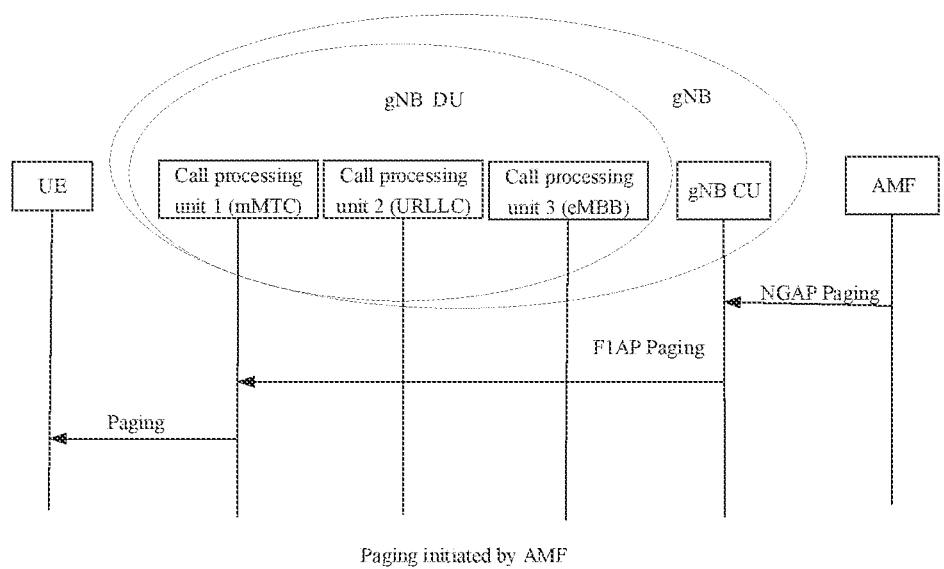
FIG. 8 is a schematic diagram of a fifth application scenario according to an embodiment of the present application.
Figure 9:
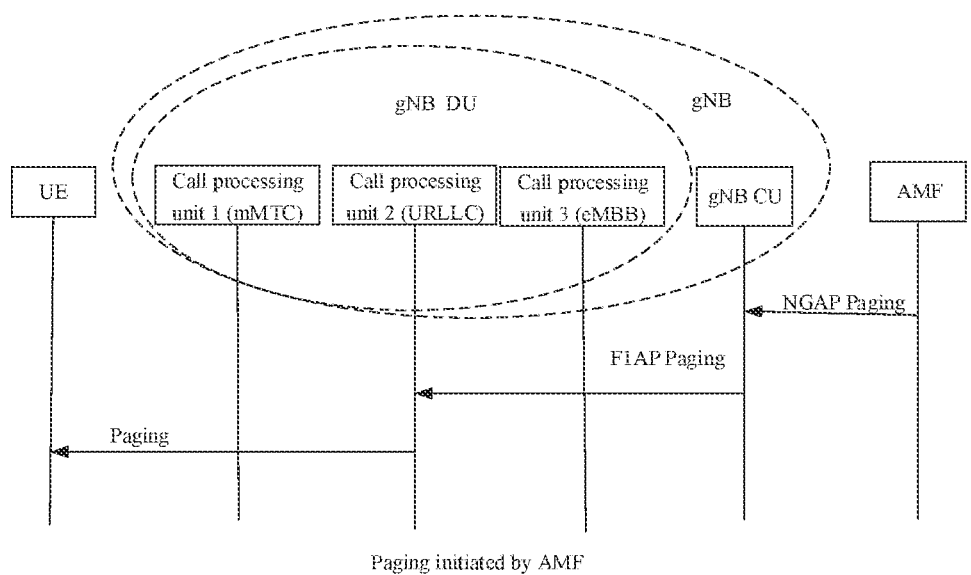
FIG. 9 is a schematic diagram of a sixth application scenario according to an embodiment of the present application.
Figure 10:
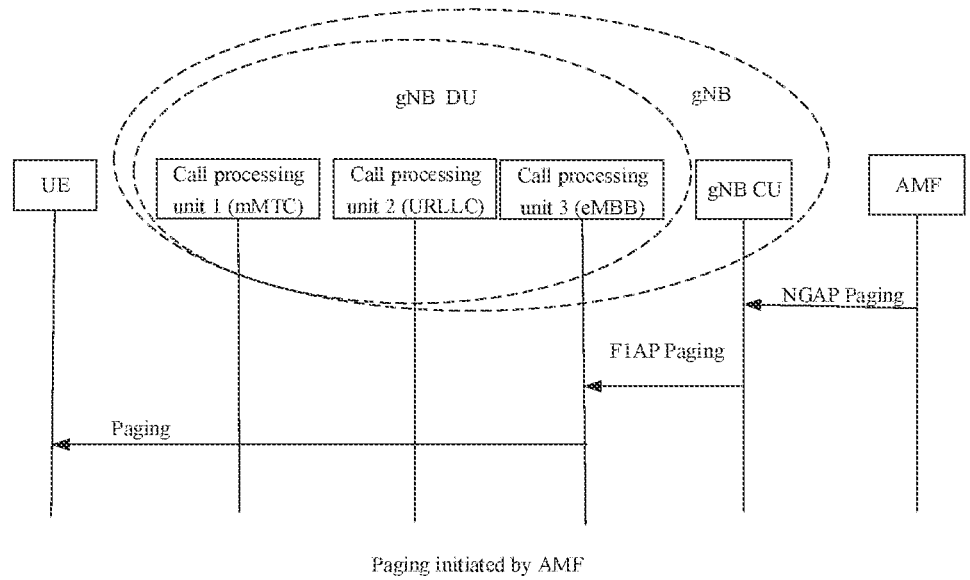
FIG. 10 is a schematic diagram of a seventh application scenario according to an embodiment of the present application.
Figure 11:
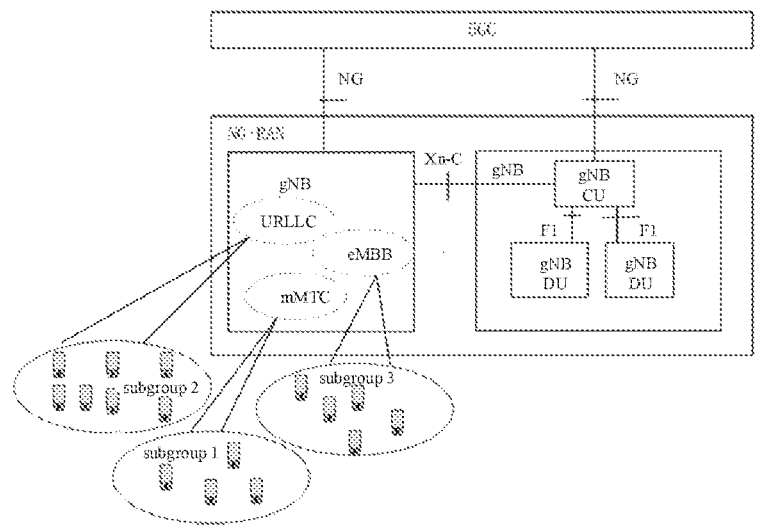
FIG. 11 is a schematic diagram of an eighth application scenario according to an embodiment of the present application.
Figure 12:
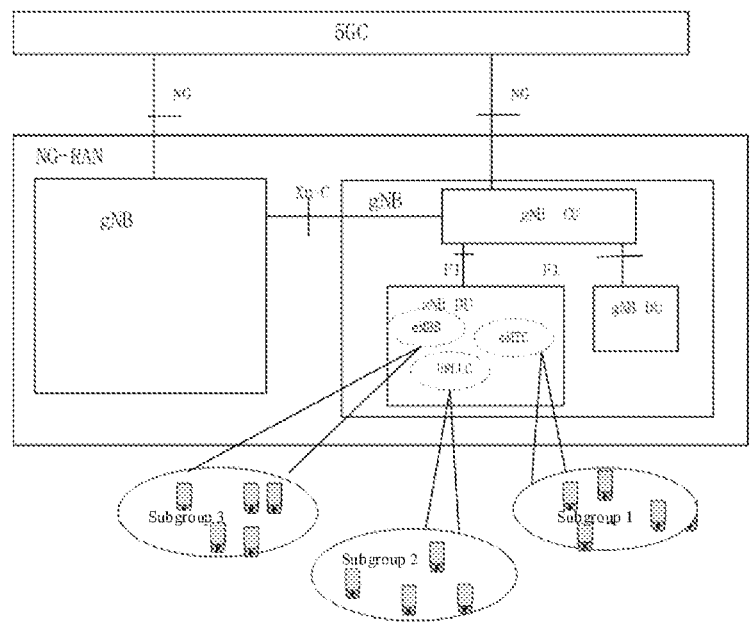
FIG. 12 is a schematic diagram of a ninth application scenario according to an embodiment of the present application.
Figure 13:
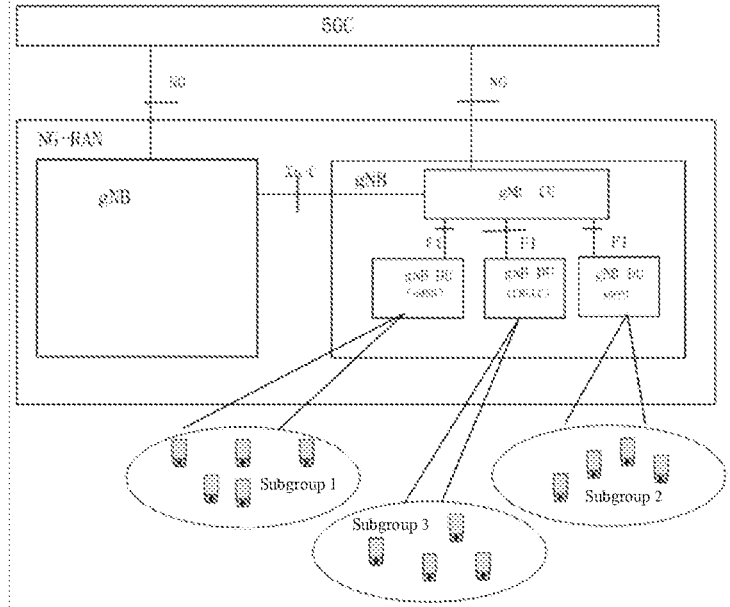
FIG. 13 is a schematic diagram of a tenth application scenario according to an embodiment of the present application.

For example, as shown in FIG. 8 to FIG. 10, at a gNB DU, all user services are classified into the three service modes, the mMTC, the URLLC, and the eMBB, and internal paging management of the three service modes are respectively embodied in different paging processing units of the gNB, which respectively correspond to a paging processing unit 1 (mMTC), a paging processing unit 2 (URLLC), and a paging processing unit 3 (eMBB). This management mode may use logical management separation (for example, one paging unit is divided into a plurality of paging processing units), or use physical management separation (for example, a plurality of paging units are divided into a plurality of paging processing units). For the logical management separation, physically there is still one gNB DU. For the physical management separation, paging processing of the three major services and related resources belong to different gNB DUs. In management of the gNB DU resources, according to service modes requested in a service request initiated during user service registration, a correspondence is established at the gNB based on the service modes and user identities. The resources are divided into three types of paging management resources that are respectively corresponding to an mMTC, an URLLC, and an eMBB. Each paging management resource maintains a UE list and corresponds to a same service mode.

In some embodiments, the method further includes: receiving service request information reported when UE establishes a service request with the base station for the first time, where the service request information includes a UE service mode and a UE identity that are corresponding to the UE; based on the UE service mode and the UE identity, establishing and storing a first correspondence between the UE service mode and the UE identity, and determining, based on the first correspondence and the preset service mode, a UE managed by each paging processing unit.

For example, when establishing a service request with a network for the first time, the UE reports its own service mode, and the gNB establishes a one-to-one correspondence between the service modes and the UE identities for a logical processing unit stored in the gNB. That is, based on the UE service mode and the UE identity that are reported by the UE, the gNB establishes and stores a first correspondence between the UE service mode and the UE identity, and then determines, bases on the UE service mode and the preset service mode in the first correspondence, a UE managed by each paging processing unit, so as to make the paging processing unit be in a one-to-one correspondence with the UE identities belonging to a same service mode.

Step 302: Receiving, from a core network, a paging message carrying a service mode indication and a target UE identity.

When an AMF in a 5G core network triggers a paging message to a 5G RAN, an NGAP paging message is triggered, where NGAP represents the NG Application Protocol and provides a signaling service between an NG-RAN node and an AMF node. For example, the NGAP paging message is added with IE information indicating a service mode indication, with a value range of three, for example, the value range is (0: eMBB, 1: URLLC, 2: mMTC). Alternatively, in order to be compatible with a terminal device from a different access system, more values in another manner may be set in the value range. For example, for a UE from an LTE call, the value range of the service mode indication may be extended to more values, for example, the value range is (0: eMBB, 1: URLLC, 2: mMTC, 3: LTE, 4: Others). The 5G RAN initiates paging of UEs on all cells in a cell group when sending the paging message. For example, the IE information included in the initiated NGAP paging message is shown in Table 1 below, where M denotes a mandatory parameter and O denotes an optional parameter.

TABLE 1

| IE information/Group Name | Presence |
| --- | --- |
| Message Type | M |
| UE Paging Identity | M |
| Paging DRX Cycle | O |
| TAI List for Paging | |
| >TAI List for Paging Item | |
| >>TAI | M |
| Paging Priority | O |
| UE Radio Capability for Paging | O |
| Paging Origin | O |
| Assistance Data for Paging | O |
| Service Mode Indication | M |

The target UE identity is a UE paging identity corresponding to a paged UE.

In some embodiments, the receiving, from a 5G core network, a paging message carrying a service mode indication and a target UE identity includes:

controlling the central unit to receive, from the core network, an NGAP paging message carrying the service mode indication and the target UE identity; and controlling the central unit to perform signaling service on the NGAP paging message through an F1 interface to generate an F1AP paging message, and sending the F1AP paging message to the distributed unit, where the F1AP paging message carries the service mode indication and the target UE identity.

When the paging message is delivered to a gNB in a form of OPEN-RAN, and a gNB CU receives, from an AMF in the 5G core network, an NGAP paging message carrying the service mode indication, the gNB CU sends an F1AP paging to a gNB DU. In this case, the F1AP paging message also carries the service mode indication. F1AP provides a signaling service between a gNB-CU node and a gNB-DU node. The services include a non-UE related service and a UE related service. For the non-UE related service, an F1 interface instance is established between the gNB-CU and the gNB-DU. For the UE-related service, signaling and data connections are provided for a UE to access the core network.

Step 303: Triggering a target paging processing unit corresponding to the service mode indication to initiate paging of a target UE, where the target UE is a UE including the target UE identity and managed by the target paging processing unit.

In some embodiments, the triggering a target paging processing unit corresponding to the service mode indication to initiate paging of a target UE includes:

determining the target UE based on the service mode indication and the first correspondence;

matching the service mode indication with the preset service mode to determine, from the plurality of paging processing units, the target paging processing unit corresponding to the service mode indication; and controlling the target paging processing unit to initiate paging of the target UE.

In some embodiments, the determining the target UE based on the service mode indication and the first correspondence includes:

matching the service mode indication with a UE service mode in the first correspondence to determine, from all UE identities in the first correspondence, a candidate UE identity that matches the service mode indication, where the candidate UE identity includes the target UE identity; and determining a UE corresponding to the candidate UE identity as the target UE.

For example, after a radio resource control (RRC) connection is established, UE sends a service request message to a core network through a gNB, where the service request message includes a service mode indication and a UE Id. When an AMF initiates paging including a UE Id and a service mode indication, the gNB receives a paging message, and then establishes a correspondence at a paging processing unit based on the service mode indication and the UE Id. The paging processing unit forwards the UE to the paging processing unit 1, the paging processing unit 2, or the paging processing unit 3 according to a corresponding service mode to allow these paging processing units to page UEs managed by respective paging processing units.

For example, when the paging message is delivered to a gNB with a CU-DU fusion architecture, and the gNB receives, from an AMF, a paging message carrying a service mode indication, the gNB establishes, based on the three major network service modes and the UE identities stored in the first correspondence in the gNB, a one-to-one correspondence between each service mode and a logical memory unit and a logical processing unit that are associated with each UE. For example, the UE identity may include an RAN UE NGAP ID in the gNB (which is used to uniquely identify UE on an NG interface in the gNB), or a C-RATI, or another identity that may identify a UE identity. When the UE establishes a service request with the network for the first time, the UE reports its own service mode (UE service mode). The gNB establishes a one-to-one correspondence between the service mode and the UE identity for the logical processing unit stored inside the gNB. That is, based on the UE service mode and the UE identity that are reported by the UE, the gNB establishes and stores a first correspondence between the UE service mode and the UE identity, and then determines, bases on the UE service mode and the preset service mode in the first correspondence, a UE managed by each paging processing unit, so as to make the paging processing unit be in a one-to-one correspondence with the UE identities belonging to a same service mode.

For example, paging management of service modes including a mMTC, an URLLC, and an eMBB are respectively embodied in different paging processing units of gNB. This management mode uses logical management separation rather than physical management separation. Physically there is still one gNB, but logically there are three gNBs. In management of gNB resources, according to service modes requested in a service request initiated during user service registration, a list is maintained in gNB according to the service modes, and the resources are divided into different paging management resources, which are respectively corresponding to different service modes: an eMBB, an URLLC, and an mMTC. Each paging management resource maintains a UE list and corresponds to a same service mode.

Referring to FIG. 4 to FIG. 6, the gNB triggers, based on the service mode indication carried in the paging message, a target paging processing unit corresponding to the service mode indication, to control the target paging processing unit to initiate paging of all UEs managed by the target paging processing unit, where the paged UEs include a target UE identity. The service mode indication is matched with a UE service mode in the first correspondence to determine, from all UE identities in the first correspondence, a candidate UE identity that matches the service mode indication, where the candidate UE identity includes the target UE identity. Then, a UE corresponding to the candidate UE identity is determined as target UE, that is, the target UE refers to all UEs managed by the target paging processing unit. Physically, all UEs are also grouped into three large groups. Paging is initiated for all UE-IDs (UE identities) associated with such service, and the paging is not received by UE-IDs associated with the other two modes of services. From the perspective of an entire cell group, energy conservation efficiency improves by saving two thirds energy.

As shown in FIG. 4, an AMF initiates paging. When receiving, from the AMF, an NGAP paging message carrying a service mode indication and a target UE identity, a gNB triggers, based on the service mode indication carried in the NGAP paging message, a target paging processing unit corresponding to the service mode indication. For example, the service mode indication is mMTC, and then a paging processing unit 1 (mMTC) is triggered. The paging processing unit 1 initiates paging of all UEs related to the mMTC service mode and managed by the paging processing unit 1, where the paged UEs include a target UE identity.

As shown in FIG. 5, an AMF initiates paging. When receiving, from the AMF, an NGAP paging message carrying a service mode indication and a target UE identity, a gNB triggers, based on the service mode indication carried in the NGAP paging message, a target paging processing unit corresponding to the service mode indication. For example, the service mode indication is URLLC, and then a paging processing unit 2 (URLLC) is triggered. The paging processing unit 2 initiates paging of all UEs related to the URLLC service mode and managed by the paging processing unit 2, where the paged UEs include a target UE identity.

As shown in FIG. 6, an AMF initiates paging. When receiving, from the AMF, an NGAP paging message carrying a service mode indication and a target UE identity, a gNB triggers, based on the service mode indication carried in the NGAP paging message, a target paging processing unit corresponding to the service mode indication. For example, the service mode indication is eMBB, and then a paging processing unit 3 (eMBB) is triggered. The paging processing unit 3 initiates paging of all UEs related to the eMBB service mode and managed by the paging processing unit 3, where the paged UEs include a target UE identity.

Referring to FIG. 8 to FIG. 10, when the paging message is delivered to a gNB in a form of OPEN-RAN, and a gNB CU receives, from an AMF, an NGAP paging message carrying a service mode indication and a target UE identity, the gNB CU sends an F1 AP paging message to a gNB DU. In this case, the F1AP paging message also carries the service mode indication and the target UE identity. F1AP provides a signaling service between a gNB-CU node and a gNB-DU node. The services include a non-UE related service and a UE related service. For the non-UE related service, an F1 interface instance is established between the gNB-CU and the gNB-DU. For the UE-related service, signaling and data connections are provided for a UE to access the core network.

In the embodiment of the present application, the gNB DU establishes a one-to-one correspondence between a service mode and a uniquely identified ID of each UE based on the three major preset service modes of the network and an RAN UE NGAP ID in the gNB (which is used to uniquely identify UE on an NG interface in the gNB), or a C-RATI, or another identity (TMSI, IMSI, SUIP, or the like) that may identify a UE identity. That is, at the gNB DU, all user services are classified into the three service modes: the mMTC, the URLLC, and the eMBB, and internal paging management of the three service modes are respectively embodied in different paging processing units of the gNB, which respectively correspond to a paging processing unit 1, a paging processing unit 2, and a paging processing unit 3. This management mode may use logical management separation (for example, one paging unit is divided into a plurality of paging processing units), or use physical management separation (for example, a plurality of paging units are divided into a plurality of paging processing units). For the logical management separation, physically there is still one gNB DU. For the physical management separation, paging processing of the three major services and related resources belong to different gNB DUs. In management of the gNB DU resources, according to service modes requested in a service request initiated during user service registration, a correspondence is established at the gNB based on the service modes and user identities. The resources are divided into three types of paging management resources that are respectively corresponding to an mMTC, an URLLC, and an eMBB. Each paging management resource maintains a UE list and corresponds to a same service mode. The gNB triggers, based on the service mode indication carried in the paging message, a target paging processing unit corresponding to the service mode indication, and the target paging processing unit initiates paging of all UEs managed by the target paging processing unit, where the paged UEs include a target UE identity. The service mode indication is matched with a UE service mode in the first correspondence to determine, from all UE identities in the first correspondence, a candidate UE identity that matches the service mode indication, where the candidate UE identity includes the target UE identity. Then, a UE corresponding to the candidate UE identity is determined as target UE, that is, the target UE refers to all UEs managed by the target paging processing unit. Physically, all UEs are also grouped into three large groups according to the service modes. Paging is initiated for all UE-IDs (UE identities) associated with such service, and the paging is not received by UE-IDs associated with the other two modes of services. From the perspective of an entire cell group, energy conservation efficiency improves by saving two thirds energy.

As shown in FIG. 8, an AMF initiates paging. When receiving, from the AMF, an NGAP paging message carrying a service mode indication and a target UE identity, a gNB CU sends an F1AP paging message to a gNB DU. In this case, the F1AP paging message also carries the service mode indication and the target UE identity. The gNB DU triggers, based on the service mode indication carried in the F1AP paging message, a target paging processing unit corresponding to the service mode indication. For example, the service mode indication is mMTC, and then a paging processing unit 1 (mMTC) in the gNB DU is triggered. The paging processing unit 1 initiates paging of all UEs related to the mMTC service mode and managed by the paging processing unit 1, where the paged UEs include a target UE identity.

As shown in FIG. 9, an AMF initiates paging. When receiving, from the AMF, an NGAP paging message carrying a service mode indication and a target UE identity, a gNB CU sends an F1AP paging message to a gNB DU. In this case, the F1AP paging message also carries the service mode indication and the target UE identity. The gNB DU triggers, based on the service mode indication carried in the F1AP paging message, a target paging processing unit corresponding to the service mode indication. For example, the service mode indication is URLLC, and then a paging processing unit 2 (URLLC) in the gNB DU is triggered. The paging processing unit 2 initiates paging of all UEs related to the URLLC service mode and managed by the paging processing unit 2, where the paged UEs include a target UE identity.

As shown in FIG. 10, an AMF initiates paging. When receiving, from the AMF, an NGAP paging message carrying a service mode indication and a target UE identity, a gNB CU sends an F1AP paging message to a gNB DU. In this case, the F1AP paging message also carries the service mode indication and the target UE identity. The gNB DU triggers, based on the service mode indication carried in the FIAP paging message, a target paging processing unit corresponding to the service mode indication. For example, the service mode indication is eMBB, and then a paging processing unit 3 (eMBB) in the gNB DU is triggered. The paging processing unit 3 initiates paging of all UEs related to the eMBB service mode and managed by the paging processing unit 3, where the paged UEs include a target UE identity.

For example, based on paging from the core network, all UEs (users) managed in a gNB cell group with a CU-DU fusion architecture may be divided into three subgroups: a subgroup 1, a subgroup 2, and a subgroup 3, and the three subgroups respectively correspond to the three service modes: the eMBB, the mMTC, and the URLLC. UEs in a cell also form different paged UE subgroups according to the service modes. Different paging processing units in a gNB paging corresponding UE subgroups. Reference may be made to the schematic diagram of paging logic shown in FIG. 11.

For example, based on paging from a core network, all UEs managed in a gNB DU cell group with a CU-DU distribution architecture may be divided into three subgroups: a subgroup 1, a subgroup 2, and a subgroup 3, and the three subgroups respectively correspond to the three service modes: the eMBB, the mMTC, and the URLLC. UEs in a cell also form different paged UE subgroups according to the service modes. Different paging management and processing units of the gNB paging corresponding UE subgroups, gNB DUs are implemented in two manners: Manner 1: One gNB DU classifies all user services into three service modes: the mMTC, the URLLC, and the eMBB. Internal paging management of the three service modes are respectively embodied in different paging processing units of the gNB, which respectively correspond to a paging processing unit 1, a paging processing unit 2, and a paging processing unit 3. Reference may be made to the schematic diagram of paging logic shown in FIG. 12. Manner 2: Three gNB DUs manage the three service modes, respectively, and all related paging processing is completed at the three gNB DUs; and all UEs in a cell group is also divided into three subgroups. Reference may be made to the schematic diagram of paging logic shown in FIG. 13.

All of the foregoing technical solutions may be randomly combined to form optional embodiments of the present application. Details are not described herein.

The embodiment of the present application is applied to a base station, in which paging management division is performed on a paging unit according to a preset service mode, to obtain a plurality of paging processing units, where different paging processing units manage UEs corresponding to different preset service modes; a paging message carrying a service mode indication and a target UE identity is received from a core network: and a target paging processing unit corresponding to the service mode indication is triggered to initiate paging of a target UE, where the target UE is a UE including the target UE identity and managed by the target paging processing unit. According to the embodiment of the present application, when receiving, from a core network, a paging message carrying a service mode indication and a target UE identity, a base station triggers, based on the service mode indication carried in the paging message, a target paging processing unit corresponding to the service mode indication, and controls the target paging processing unit to initiate paging of all UEs related to the service mode indication and managed by the target paging processing unit, but does not initiate paging of another UE associated with another service mode, so that power consumption may be reduced.

Figure 14:
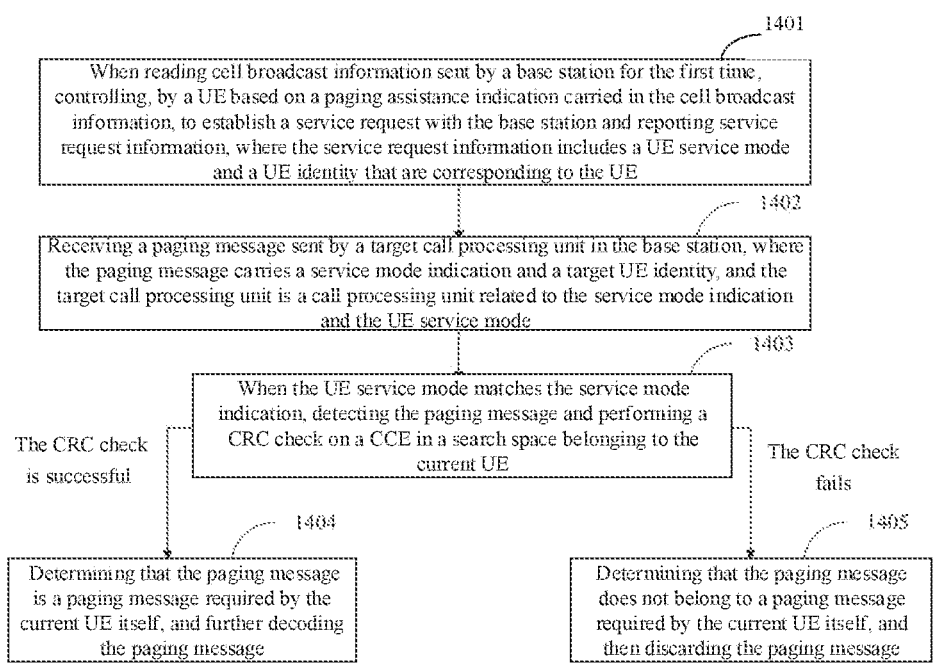
FIG. 14 is a schematic diagram of a second process of a paging processing method according to an embodiment of the present application.

Referring to FIG. 14, FIG. 14 is a schematic diagram of a second process of a paging processing method according to an embodiment of the present application. The method is applied to a UE, and the method includes the following steps:

Step 1401: when reading cell broadcast information sent by a base station for the first time, controlling, based on a paging assistance indication carried in the cell broadcast information, the UE to establish a service request with the base station and reporting service request information, where the service request information includes a UE service mode and a UE identity that are corresponding to the UE;

Step 1402: receiving a paging message sent by a target paging processing unit in the base station, where the paging message carries a service mode indication and a target UE identity, and the target paging processing unit is a paging processing unit related to the service mode indication and the UE service mode:

Step 1403: when the UE service mode matches the service mode indication, detecting the paging message and performing a CRC check on a CCE in a search space belonging to a current UE: and if the CRC check is successful, performing Step 1404; or if the CRC check fails, performing Step 1405:

Step 1404: determining that the paging message is valid information, and performing data processing on the paging message; and Step 1405: determining that the paging message is invalid information, and then discarding the paging message.

For example, since logical paging management is performed on a gNB, for a terminal (UE), when the UE periodically reads cell broadcast information for the first time, a master information block (MIB) informs all UEs in a cell of whether the cell supports a paging assistance indication, and the UE reports its own service mode in a service request message after reading the cell broadcast information. The MIB may include downlink system bandwidth. PHICH configuration, and a system frame number (SFN). For example, 1 bit of 11 bit is reserved by the MIB as a paging assistance indication for indicating whether the cell triggers paging based on a service mode, and also indicating a specific service mode of the paging, where the service mode of the paging may be determined according to a UE group. When UEs in a same service mode or a UE subgroup corresponding to a service mode for paging receives the paging, the UEs need to blindly detect a DCI format. For example, the paging message includes control information. When all UEs corresponding to such service attempt to decode Control Channel Elements (CCEs) of all search spaces in one piece of control information (such as a candidate PDCCH), a CCE belonging to a search space of a current UE is first determined from the CCEs of all search spaces, and then a CRC check is performed on the CCE belonging to a search space of the current UE, where the CRC check is a cyclic redundancy check. If the CRC check is successful, the UE considers that the control information belongs to itself, and then learns a corresponding DCI format, thereby further decoding DCI content, for example, performing scheduling allocation, scheduling authorization and the like on the control information to decode the DCI content. If a CRC check for the CCEs of all search spaces is not successful, the UE considers that the control information has any one of the following cases: the control information generates an error that cannot be replied during transmission: or the control information does not belong to the UE, the control information is for sending to another terminal corresponding to the same service, and the control information (such as a PDCCH) is ignored or discarded by the current UE. For each UE in the entire cell, in the embodiment of the present application, there is no need to perform a CRC check, scheduling allocation, and scheduling authorization in sequence on a candidate PDCCH. In the embodiment of the present application, scheduling allocation and scheduling authorization are performed only when the CRC check is successful, and a probability of paging detection is only one third of an original probability. Therefore, power consumption of a terminal is correspondingly greatly reduced.

The embodiment of the present application is applied to a UE. When the UE reads cell broadcast information sent by a base station for the first time, the UE is controlled, based on a paging assistance indication carried in the cell broadcast information, to establish a service request with the base station and report service request information, where the service request information includes a UE service mode and a UE identity that are corresponding to the UE: the UE receives a paging message sent by a target paging processing unit in the base station, where paging message carries a service mode indication and a target UE identity, and the target paging processing unit is a paging processing unit related to the service mode indication and the UE service mode; when the UE service mode matches the service mode indication, the UE detects the paging message and performs a CRC check on a CCE in a search space belonging to a current UE: and if the CRC check is successful, the UE determines that the paging message is a paging message required by the current UE itself, and further decodes the paging message; or if the CRC check fails, the UE determines that the paging message does not belong to a paging message required by the current UE itself, and then discards the paging message. In the embodiment of the present application, on a terminal side, scheduling allocation and scheduling authorization are performed only when the CRC check is successful, and a probability of paging detection is only one third of an original probability. Therefore, power consumption of a terminal is correspondingly greatly reduced.

Figure 15:
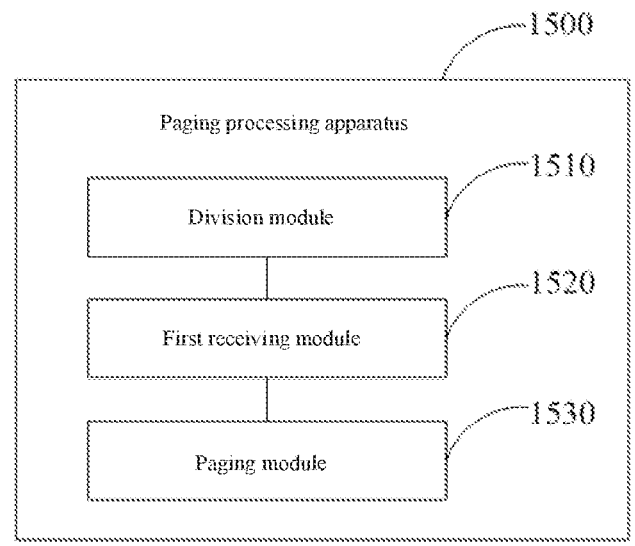
FIG. 15 is a schematic diagram of a first structure of a paging processing apparatus according to an embodiment of the present application.

In order to better implement the paging processing methods of the embodiment of the present application, an embodiment of the present application further provides a paging processing apparatus. Referring to FIG. 15, FIG. 15 is a schematic diagram of a first structure of a paging processing apparatus according to an embodiment of the present application. The paging processing apparatus 1500 is applied to a base station including a paging unit, and the paging processing apparatus 1500 includes.

a division module 1510, configured to perform paging management division on the paging unit according to a preset service mode, to obtain a plurality of paging processing units, where different paging processing units manage UEs corresponding to different preset service modes;

a first receiving module 1520, configured to receive, from a 5G core network, a paging message carrying a service mode indication and a target UE identity; and a paging module 1530, configured to trigger a target paging processing unit corresponding to the service mode indication to initiate paging of a target UE, where the target UE is a UE including the target UE identity and managed by the target paging processing unit.

In some embodiments, the paging processing apparatus 1500 further includes an establishment module, configured to:

receive service request information reported when UE establishes a service request with the base station for the first time, where the service request information includes a UE service mode and a UE identity that are corresponding to the UE;

based on the UE service mode and the UE identity, establish and store a first correspondence between the UE service mode and the UE identity; and determine, based on the first correspondence and the preset service mode, a UE managed by each paging processing unit.

In some embodiments, the base station includes a central unit and a distributed unit, and the division module 1510 is configured to:

perform, according to the preset service mode, paging management division on one paging unit located in the distributed unit, to obtain a plurality of paging processing units; or perform, according to the preset service mode, paging management division on a plurality of paging units located in the distributed unit, to obtain a plurality of paging processing units.

In some embodiments, the first receiving module 1520 is configured to:

control the central unit to receive, from the core network, an NGAP paging message carrying the service mode indication and the target UE identity; and control the central unit to perform signaling service on the NGAP paging message through an F1 interface to generate an F1AP paging message, and send the F1AP paging message to the distributed unit, where the F1AP paging message carries the ser"ice mode indication and the target UE identity.

In some embodiments, the paging module 1530 is configured to:

determine the target UE based on the service mode indication and the first correspondence;

match the service mode indication with the preset service mode to determine, from the plurality of paging processing units, the target paging processing unit corresponding to the service mode indication; and control the target paging processing unit to initiate paging of the target UE.

In some embodiments, the paging module 1530 being configured to determine the target UE based on the service mode indication and the first correspondence specifically includes:

match the service mode indication with a UE service mode in the first correspondence to determine, from all UE identities in the first correspondence, a candidate UE identity that matches the service mode indication, where the candidate UE identity includes the target UE identity; and determine a UE corresponding to the candidate UE identity as the target UE.

In some embodiments, the preset service mode includes an eMBB, an mMTC, and an URLLC. The division module 1510 is configured to:

perform paging management division on the paging unit according to the preset service mode, to obtain a paging processing unit corresponding to the eMBB, a paging processing unit corresponding to the mMTC, and a paging processing unit corresponding to the URLLC.

Figure 16:
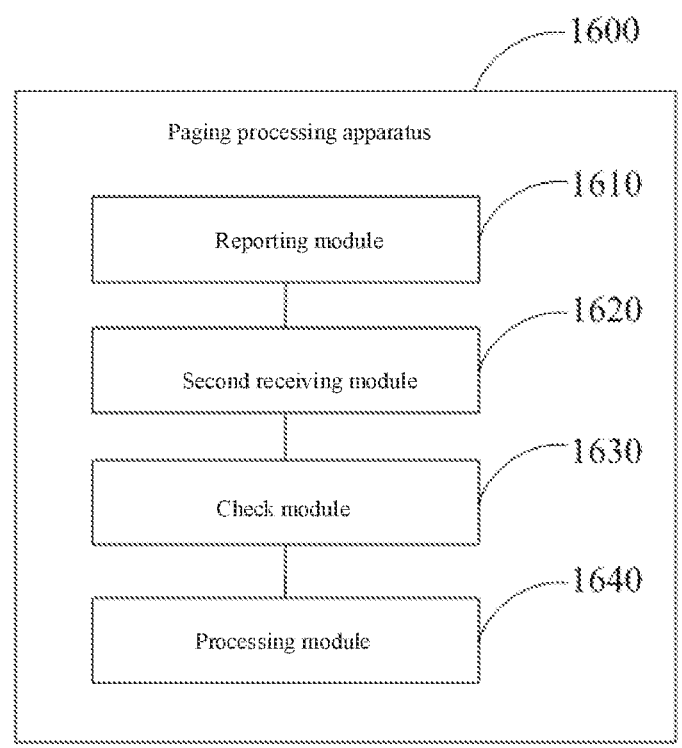
FIG. 16 is a schematic diagram of a second structure of a paging processing apparatus according to an embodiment of the present application.

Referring to FIG. 16, FIG. 16 is a schematic diagram of a second structure of a paging processing apparatus according to an embodiment of the present application. The paging processing apparatus 1600 is applied to a UE, and the paging processing apparatus 1600 includes:

a reporting module 1610, configured to: when reading cell broadcast information sent by a base station for the first time, control the UE based on a paging assistance indication carried in the cell broadcast information to establish a service request with the base station and report service request information, where the service request information includes a UE service mode and a UE identity that are corresponding to the UE;

a second receiving module 1620, configured to receive a paging message sent by a target paging processing unit in the base station, where the paging message carries a service mode indication and a target UE identity, and the target paging processing unit is a paging processing unit related to the service mode indication and the UE service mode;

a check module 1630, configured to: when the UE service mode matches the service mode indication, detect the paging message and perform a CRC check on a CCE in a search space belonging to a current UE: and a processing module 1640, configured to: if the CRC check is successful, determine that the paging message is a paging message required by the current UE itself, and further decode the paging message; or if the CRC check fails, determine that the paging message does not belong to a paging message required by the current UE itself, and then discard the paging message.

All of the foregoing technical solutions may be randomly combined to form optional embodiments of the present application. Details are not described herein.

It should be understood that the apparatus embodiments may correspond to the method embodiments, and for similar descriptions, reference may be made to the method embodiments. To avoid repetition, details are not described herein. Specifically, the apparatus shown in FIG. 15 or FIG. 16 may perform the foregoing paging processing method embodiments, and the foregoing and other operations and/or functions of each unit in the apparatus respectively implement the corresponding processes of the method embodiments. For brevity, details are not described herein.

Figure 17:
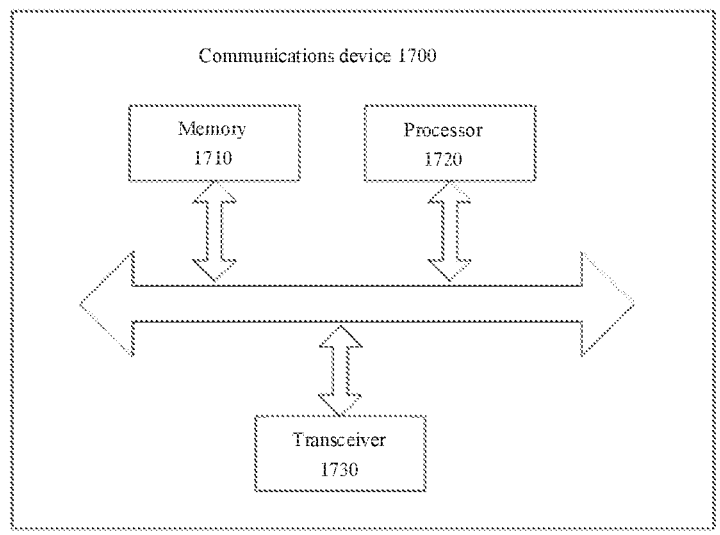
FIG. 17 is a schematic structural diagram of a communications device according to an embodiment of the present application.

FIG. 17 is a schematic structural diagram of a communications device according to an embodiment of the present application. The communications device 1700 shown in FIG. 17 includes a processor 1710, and the processor 1710 may call and run a computer program from a memory to implement the method in an embodiment of the present application.

In some embodiments, as shown in FIG. 17, the communications device 1700 may further include a memory 1720. The processor 1710 may call and run a computer program from the memory 1720 to implement the method in an embodiment of the present application.

The memory 1720 may be a separate device independent of the processor 1710, or may be integrated in the processor 1710.

In some embodiments, as shown in FIG. 17, the communications device 1700 may further include a transceiver 1730. The processor 1710 may control the transceiver 1730 to communicate with another device, specifically, may transmit information or data to the another device or receive information or data transmitted by the another device.

The transceiver 1730 may include a transmitter and a receiver. The transceiver 1730 may further include an antenna, and a quantity of antennas may be one or more.

In some embodiments, the communications device 1700 may be specifically the network device according to an embodiment of the present application, and the communications device 1700 may implement corresponding processes implemented by the network device (such as a base station) in various methods according to the embodiments of the present application. For brevity, details are not described herein.

In some embodiments, the communications device 1700 may be specifically the terminal device according to an embodiment of the present application, and the communications device 1700 may implement corresponding processes implemented by the terminal device (such as UE) in various methods according to the embodiments of the present application. For brevity, details are not described herein.

Figure 18:
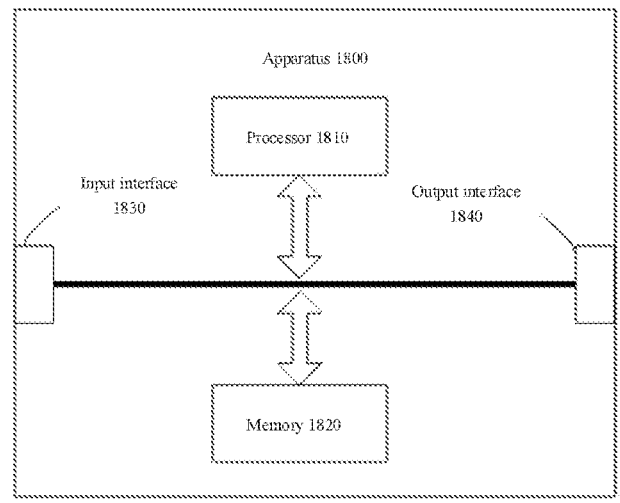
FIG. 18 is a schematic structural diagram of an apparatus according to an embodiment of the present application.

FIG. 18 is a schematic structural diagram of an apparatus according to an embodiment of the present application. The apparatus 1800 shown in FIG. 18 includes a processor 1810, and the processor 1810 may call and run a computer program from a memory to implement the method in an embodiment of the present application.

In some embodiments, as shown in FIG. 18, the apparatus 1800 may further include a memory 1820. The processor 1810 may call and run a computer program from the memory 1820 to implement the method in an embodiment of the present application.

The memory 1820 may be a separate device independent of the processor 1810, or may be integrated in the processor 1810.

In some embodiments, the apparatus 1800 may further include an input interface 1830. The processor 1810 may control the input interface 1830 to communicate with another device or chip, and specifically, may obtain information or data transmitted by the another device or chip.

In some embodiments, the apparatus 1800 may further include an output interface 1840. The processor 1810 may control the output interface 1840 to communicate with another device or chip, and specifically, may output information or data to the another device or chip.

In some embodiments, the apparatus may be applied to the network device in the embodiments of the present application, and the apparatus may implement the corresponding processes implemented by the network device in various methods of the embodiments of the present application. For brevity, details are not described herein.

In some embodiments, the apparatus may be applied to the terminal device in the embodiments of the present application, and the apparatus may implement the corresponding processes implemented by the terminal device in various methods in the embodiments of the present application. For brevity, details are not described herein.

In some embodiments, the apparatus referred to in the embodiment of the present application may alternatively be a chip. For example, the chip may be a system-level chip, a system chip, a chip system, a system-on-chip, or the like.

Figure 19:
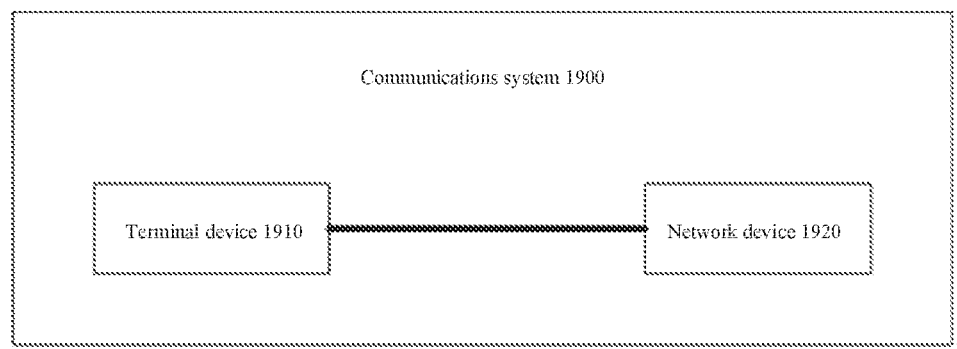
FIG. 19 is a schematic diagram of a second structure of a communications system according to an embodiment of the present application.

FIG. 19 is a schematic diagram of a second structure of a communications system 1900 according to an embodiment of the present application. As shown in FIG. 19, the communications system 1900 includes a terminal device 1910 and a network device 1920.

The terminal device 1910 may be used to implement corresponding functions implemented by the terminal device in the foregoing methods, and the network device 1920 may be used to implement corresponding functions implemented by the network device or the base station in the foregoing methods. For brevity, details are not described herein.

It should be understood that, a processor in the embodiment of the present application may be an integrated circuit chip having a signal processing capability. In an implementation process, the steps in the foregoing method embodiments may be performed by using an integrated logic circuit of hardware of the processor or instructions in a software form. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of the present application. The general purpose processor may be a microprocessor or the processor may be any conventional processor or the like. Steps of the methods disclosed with reference to the embodiments of the present application may be directly performed and accomplished through a hardware decoding processor, or may be performed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information from the memory, and performs the steps of the foregoing methods in combination with hardware of the processor.

It may be understood that the memory in the embodiment of the present application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and methods described in this specification includes but is not limited to these and any memory of another proper type.

It should be understood that, by way of example but not limitative description, for example, the memory in the embodiment of the present application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DR RAM). In other words, the memory in the embodiment of the present application includes but is not limited to these and any memory of another proper type.

An embodiment of the present application further provides a computer-readable storage medium for storing a computer program.

In some embodiments, the computer-readable storage medium may be applied to the network device or the base station in the embodiments of the present application, and the computer program causes a computer to perform the corresponding processes implemented by the network device or the base station in various methods in the embodiments of the present application. For brevity, details are not described herein.

In some embodiments, the computer-readable storage medium may be applied to the mobile terminal/terminal device/user equipment in the embodiments of the present application, and the computer program causes a computer to perform the corresponding processes implemented by the mobile terminal/terminal device/user equipment in various methods in the embodiments of the present application. For brevity, details are not described herein.

An embodiment of the present application further provides a computer program product including computer program instructions.

In some embodiments, the computer program product may be applied to the network device or the base station in the embodiments of the present application, and the computer program instructions cause a computer to perform the corresponding processes implemented by the network device or the base station in various methods in the embodiments of the present application. For brevity, details are not described herein.

In some embodiments, the computer program product may be applied to the mobile terminal/terminal device/user equipment in the embodiments of the present application, and the computer program instructions cause a computer to perform the corresponding processes implemented by the mobile terminal/terminal device/user equipment in various methods in the embodiments of the present application. For brevity, details are not described herein.

An embodiment of the present application further provides a computer program.

In some embodiments, the computer program may be applied to the network device or the base station in the embodiments of the present application, and when the computer program is run on a computer, the computer is enabled to perform the corresponding processes implemented by the network device or the base station in various methods in the embodiments of the present application. For brevity, details are not described herein.

In some embodiments, the computer program may be applied to the mobile terminal/terminal device in the embodiments of the present application, and when the computer program is run on a computer, the computer is enabled to perform the corresponding processes implemented by the mobile terminal/terminal device/user equipment in various methods in the embodiments of the present application. For brevity, details are not described herein.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that, the disclosed system, apparatus, and method may be implemented in other manners. For example, the described apparatus embodiments are merely examples. For example, the unit division or module division is merely logical function division and may be other division in actual implementation. For example, a plurality of units, modules, or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units or modules described as separate components may be or may not be physically separated, and the components displayed as units or modules may be or may not be physical units, that is, may be located in one place or distributed on a plurality of network units. Some or all of the units or modules may be selected according to an actual need to achieve the objectives of the solutions of the embodiments.

In addition, the functional units or modules in the embodiments of the present application may be integrated into one processing unit or module, or each of the units or modules may exist alone physically, or two or more units may be integrated into one unit, or two or more modules may be integrated into one module.

When the functions are implemented in a form of a software function unit or module and sold or used as an independent product, the functions may be stored in a computer-readable storage medium, some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of the present application. The foregoing storage medium includes various media that may store a program code, such as a USB flash drive, a mobile hard disk, a Read-only Memory (ROM), a Random Access Memory (RAM), a magnetic disk, or an optical disk.

The foregoing descriptions are only specific implementations of the present application, but the protection scope of the present application is not limited thereto. Any modifications or replacements easily conceived by those skilled in the art w % ithin the disclosed technical scope of the present application shall fall within the protection scope of the present application. Therefore, the protection scope of the present application should be subject to the protection scope of the claims.

What is claimed is:

1. A paging processing method, applied to a base station comprising a paging unit, wherein the method comprises:
   performing paging management on the paging unit according to a preset service mode, to obtain a plurality of paging processing units, wherein different paging processing units manage user equipments (UEs) corresponding to different preset service modes;
   receiving service request information reported when a UE sends a service request to the base station, wherein the service request information comprises a UE service mode and a UE identity that are corresponding to the UE:
   based on the UE service mode and the UE identity, establishing and storing a first correspondence between the UE service mode and the UE identity; and
   determining, based on the first correspondence and the preset service mode, a paging processing unit that manages paging for the UE.

2. The paging processing method according to claim 1, further comprising:
   receiving, from a core network, a paging message carrying a service mode indication and a target UE identity; and
   triggering a target paging processing unit corresponding to the service mode indication to initiate paging of a target UE, wherein the target UE is a UE comprising the target UE identity and managed by the target paging processing unit.

3. The paging processing method according to claim 2, wherein the base station comprises a central unit and a distributed unit, and the performing paging management on the paging unit according to a preset service mode, to obtain a plurality of paging processing units comprises:
   performing, according to the preset service mode, paging management division on one paging unit located in the distributed unit, to obtain a plurality of paging processing units.

4. The paging processing method according to claim 3, wherein the receiving a paging message carrying a service mode indication and a target UE identity from a core network comprises:
   controlling the central unit to receive, from the core network, a paging message carrying the service mode indication and the target UE identity.

5. The paging processing method according to claim 2, wherein the triggering a target paging processing unit corresponding to the service mode indication to initiate paging of a target UE comprises:
   determining the target UE based on the service mode indication and the first correspondence;
   matching the service mode indication with the preset service mode to determine, from the plurality of paging processing units, the target paging processing unit corresponding to the service mode indication; and
   controlling the target paging processing unit to initiate paging of the target UE.

6. The paging processing method according to claim 5, wherein the determining the target UE based on the service mode indication and the first correspondence comprises:
   matching the service mode indication with a UE service mode in the first correspondence to determine, from UE identities in the first correspondence, a candidate UE identity that matches the service mode indication, wherein the candidate UE identity comprises the target UE identity; and
   determining a UE corresponding to the candidate UE identity as the target UE.

7. A paging processing method, applied to a user equipment (UE), wherein the method comprises:
   after reading cell broadcast information sent by a base station, sending, by the UE, based on a paging assistance indication carried in the cell broadcast information, a service request to the base station, wherein the service request comprises service request information and the service request information comprises a UE service mode and a UE identity that are corresponding to the UE;
   receiving a paging message sent by a target paging processing unit in the base station, wherein the paging message carries a service mode indication and a target UE identity, and the target paging processing unit is a paging processing unit to the service mode indication and the UE service mode;
   when the UE service mode matches the service mode indication, detecting the paging message and performing a cyclic redundancy check (CRC) check on a control channel element (CCE) in a search space belonging to the UE; and
   if the CRC check is successful, determining that the paging message is a paging message required by the UE, and further decoding the paging message; or
   if the CRC check fails, determining that the paging message does not belong to a paging message required by the UE, and discarding the paging message.

8. A base station, comprising
   at least one processor;
   one or more non-transitory computer-readable storage medium coupled to the at least one processor and storing programming instructions for execution by the at least one processor, wherein the programming instructions, when executed, cause the base station to perform operations comprising:
   performing paging management on the a paging unit of the base station according to a preset service mode, to obtain a plurality of paging processing units, wherein different paging processing units manage user equipments (UEs) corresponding to different preset service modes;
   receiving service request information reported when a UE sends a service request to the base station, wherein the service request information comprises a UE service mode and a UE identity that are corresponding to the UE;
   based on the UE service mode and the UE identity, establishing and storing a first correspondence between the UE service mode and the UE identity; and
   determining, based on the first correspondence and the preset service mode, a paging processing unit that manages paging for the UE.

9. The base station according to claim 8, wherein the operations further comprise:

receiving, from a core network, a paging message carrying a service mode indication and a target UE identity; and triggering a target paging processing unit corresponding to the service mode indication to initiate paging of a target UE, wherein the target UE is a UE comprising the target UE identity and managed by the target paging processing unit.

10. The base station according to claim 9, wherein the base station comprises a central unit and a distributed unit, and the performing paging management on the paging unit according to a preset service mode, to obtain a plurality of paging processing units comprises:

performing, according to the preset service mode, paging management on one paging unit located in the distributed unit, to obtain a plurality of paging processing units.

11. The base station according to claim 10, wherein the receiving a paging message carrying a service mode indication and a target UE identity from a core network comprises:

controlling the central unit to receive, from the core network, a paging message carrying the service mode indication and the target UE identity.

12. The base station according to claim 9, wherein the triggering a target paging processing unit corresponding to the service mode indication to initiate paging of a target UE comprises:

determining the target UE based on the service mode indication and the first correspondence;

matching the service mode indication with the preset service mode to determine, from the plurality of paging processing units, the target paging processing unit corresponding to the service mode indication; and controlling the target paging processing unit to initiate paging of the target UE.

13. The base station according to claim 12, wherein the determining the target UE based on the service mode indication and the first correspondence comprises:

matching the service mode indication with a UE service mode in the first correspondence to determine, from UE identities in the first correspondence, a candidate UE identity that matches the service mode indication, wherein the candidate UE identity comprises the target UE identity; and determining a UE corresponding to the candidate UE identity as the target UE.

14. A user equipment (UE), comprising:
at least one processor;
one or more non-transitory computer-readable storage medium coupled to the at least one processor and storing programming instructions for execution by the at least one processor, wherein the programming instructions, when executed, cause the UE to perform operations comprising:

after reading cell broadcast information sent by a base station, sending, based on a paging assistance indication carried in the cell broadcast information, a service request to the base station, wherein the service request comprises service request information and the service request information comprises a UE service mode and a UE identity that are corresponding to the UE;

receiving a paging message sent by a target paging processing unit in the base station, wherein the paging message carries a service mode indication and a target UE identity, and the target paging processing unit is a paging processing unit corresponds to the service mode indication and the UE service mode;

when the UE service mode matches the service mode indication, detecting the paging message and performing a cyclic redundancy check (CRC) check on a control channel element (CCE) in a search space belonging to the UE; and if the CRC check is successful, determining that the paging message is a paging message required by the UE, and further decoding the paging message; or if the CRC check fails, determining that the paging message does not belong to a paging message required by the UE, and then discarding the paging message.

15. A chip, comprising a processor, wherein the processor is configured to call a computer program from a memory and run the computer program, to enable a device provided with the chip to performs the paging processing method according to claim 1.

16. A chip, comprising a processor, wherein the processor is configured to call a computer program from a memory and run the computer program, to enable a device provided with the chip to perform the paging processing method according to claim 7.

17. A non-transitory computer-readable storage medium, wherein the computer-readable storage medium stores a computer program, and the computer program is adapted to be loaded by a processor to perform the paging processing method according to claim 1.

18. A non-transitory computer-readable storage medium, wherein the computer-readable storage medium stores a computer program, and the computer program is adapted to be loaded by a processor to perform the paging processing method according to claim 7.

* * * * *